US012743802B2

(12) United States Patent
Liu et al.

(10) Patent No.: US 12,743,802 B2
(45) Date of Patent: Sep. 22, 2026

(54) UNIFORM FILTER TO COMPENSATE FOR GLOBAL INACCURACIES USING PHOTOMETRIC STEREO

(71) Applicant: UnitX, Inc., Santa Clara, CA (US)

(72) Inventors: Tommy Liu, Santa Clara, CA (US); Killian Weber, Santa Clara, CA (US); Roman Balak, San Jose, CA (US); Hill Ma, Santa Clara, CA (US)

(73) Assignee: UnitX, Inc., Santa Clara, CA (US)

( * ) Notice: Subject to any disclaimer, the term of this patent is extended or adjusted under 35 U.S.C. 154(b) by 335 days.

(21) Appl. No.: 18/369,006

(22) Filed: Sep. 15, 2023

(65) Prior Publication Data

US 2025/0095180 A1 Mar. 20, 2025

(51) Int. Cl.
*G06T 7/586* (2017.01)
*G06T 5/20* (2006.01)
(Continued)

(52) U.S. Cl.
CPC ................ *G06T 7/586* (2017.01); *G06T 5/20* (2013.01); *G06T 5/50* (2013.01); *G06T 5/70* (2024.01);
(Continued)

(58) Field of Classification Search
CPC .. G06T 7/586; G06T 5/20; G06T 5/50; G06T 5/70; G06T 7/0004; G06T 2207/10152;
(Continued)

(56) References Cited

U.S. PATENT DOCUMENTS 5,930,383 A * 7/1999 Netzer .................. G01C 11/02 382/285
2015/0287192 A1* 10/2015 Sasaki .................... H04N 23/56 382/128
2022/0076436 A1* 3/2022 Zuta ..................... H04N 13/271

FOREIGN PATENT DOCUMENTS

| JP | H0735542 | 2/1995 |
|---|---|---|
| KR | 20230060149 | 5/2023 |
| WO | WO-2025059622 A1 | 3/2025 |

OTHER PUBLICATIONS

Lee, J.-H., Hyun Ju Oh, & Eun Kyung Kim. (2019). Deep learning based 3D defect detection system using photometric stereo illumination. https://doi.org/10.1109/icaiic.2019.8669005 (Year: 2019).*

(Continued)

*Primary Examiner* — Gregory A Morse
*Assistant Examiner* — David Alexander Wambst
(74) *Attorney, Agent, or Firm* — Schwegman Lundberg & Woessner, P.A.

(57) ABSTRACT

In an example embodiment, a uniform filtering technique is applied using photometric stereo to reduce or eliminate global defects in a scanned component. An image is taken of a component using a photometric stereo technique. A uniform filter then, for every point in the component, takes an average of heights of the points near it. This essentially "blurs" the image. The blurring may be repeated multiple times. The blurred image may then be subtracted from the original image, essentially flattening out the image in a manner that reduces or eliminated global inaccuracies. The post-filtered image can then be used for defect detection, with that defect detection being more accurate because of the reduction of the global inaccuracies.

20 Claims, 20 Drawing Sheets

(51) Int. Cl.
*G06T 5/50* (2006.01)
*G06T 5/70* (2024.01)
*G06T 7/00* (2017.01)

(52) U.S. Cl.
CPC .. *G06T 7/0004* (2013.01); *G06T 2207/10152* (2013.01); *G06T 2207/20081* (2013.01); *G06T 2207/20084* (2013.01); *G06T 2207/20224* (2013.01)

(58) Field of Classification Search
CPC . G06T 2207/20081; G06T 2207/20084; G06T 2207/20224; G01N 21/8806; G01N 21/01; G01N 21/8851; G01N 2021/8887
See application file for complete search history.

(56) References Cited

OTHER PUBLICATIONS

Saiz, F. A., Barandiaran, I., Arbelaiz, A., & Graña, M. (2022). Photometric Stereo-Based Defect Detection System for Steel Components Manufacturing Using a Deep Segmentation Network. Sensors, 22(3), 882. https://doi.org/10.3390/s22030882 (Year: 2022).*

Cao, Y., Ding, B., Chen, J., Liu, W., Guo, P., Huang, L., & Yang, J. (2022). Photometric-Stereo-Based Defect Detection System for Metal Parts. Sensors, 22(21), 8374. https://doi.org/10.3390/s22218374 (Year: 2022).*

Gharesi, N., Arefi, M. M., Razavi-Far, R., Zarei, J., & Yin, S. (2020). A neuro-wavelet based approach for diagnosing bearing defects. Advanced Engineering Informatics, 46, 101172. https://doi.org/10.1016/j.aei.2020.101172 (Year: 2020).*

MaximDL. (Mar. 2021). Low-Pass Filtering (Blurring). Cdn. diffractionlimited.com. https://cdn.diffractionlimited.com/help/maximdl/Low-Pass_Filtering.htm (Year: 2021).*

"International Application Serial No. PCT US2024 046830, International Search Report mailed Dec. 20, 2024", 3 pgs.

"International Application Serial No. PCT US2024 046830, Written Opinion mailed Dec. 20, 2024", 4 pgs.

* cited by examiner 204
200
202
206A
206B

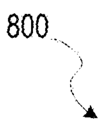

USE A CAMERA TO CAPTURE MULTIPLE IMAGES OF A COMPONENT, EACH IMAGE BEING LIT BY A DIFFERENT LIGHT SOURCE OF A PLURALITY OF INDEPENDENTLY CONTROLLABLE LIGHT SOURCES 802

APPLY PHOTOMETRIC STEREO TO THE MULTIPLE IMAGES TO ESTIMATE SURFACE HEIGHT OF EACH POINT ALONG A SURFACE OF THE COMPONENT, RELATIVE TO A HORIZONTAL LINE IN EACH OF THE MULTIPLE IMAGES 804

BLUR THE FIRST VERSION OF THE TWO-DIMENSIONAL HEIGHT MAP USING A BLURRING TECHNIQUE, PRODUCING A FIRST BLURRED VERSION OF THE TWO-DIMENSIONAL HEIGHT MAP 806

SUBTRACT THE FIRST BLURRED VERSION FROM THE FIRST VERSION OF THE TWO-DIMENSIONAL HEIGHT MAP, RESULTING IN A TWO-DIMENSIONAL DEPTH MAP OF THE SURFACE 808

REPEAT THE BLURRING AND SUBTRACTING AT LEAST ONCE USING THE DEPTH MAP, PRODUCING A FINAL VERSION OF THE TWO-DIMENSIONAL DEPTH MAP 810

MEASURE CHANGE IN DEPTH OF A FEATURE OF THE SURFACE OF THE COMPONENT IN THE FINAL VERSION OF THE TWO-DIMENSIONAL DEPTH MAP 812

USE THE CHANGE IN DEPTH OF THE FEATURE TO DETERMINE WHETHER THE FEATURE IS A DEFECT IN THE COMPONENT 814

*FIG. 8*

UNIFORM FILTER TO COMPENSATE FOR GLOBAL INACCURACIES USING PHOTOMETRIC STEREO

TECHNICAL FIELD

This application relates generally to defect inspection. More particularly, this application relates to a uniform filter to compensate for global inaccuracies in inspected components using photometric stereo.

BACKGROUND

During manufacturing quality control processes, especially high-volume production, a camera-based imaging system is usually implemented to take photos of the parts for automatic defect scanning. In the application of fly capture, when parts don't come to a stop in front of the camera, a high-speed camera capture with sufficient part illumination is required to ensure a clear image with no image blur, and there is also sometimes a need to execute multiple different combinations of light channels.

BRIEF DESCRIPTION OF DRAWINGS

FIG. 8 is a flow diagram illustrating a method of performing photometric stereo with uniform filtering, in accordance with an example embodiment.

DETAILED DESCRIPTION

Figure 1:
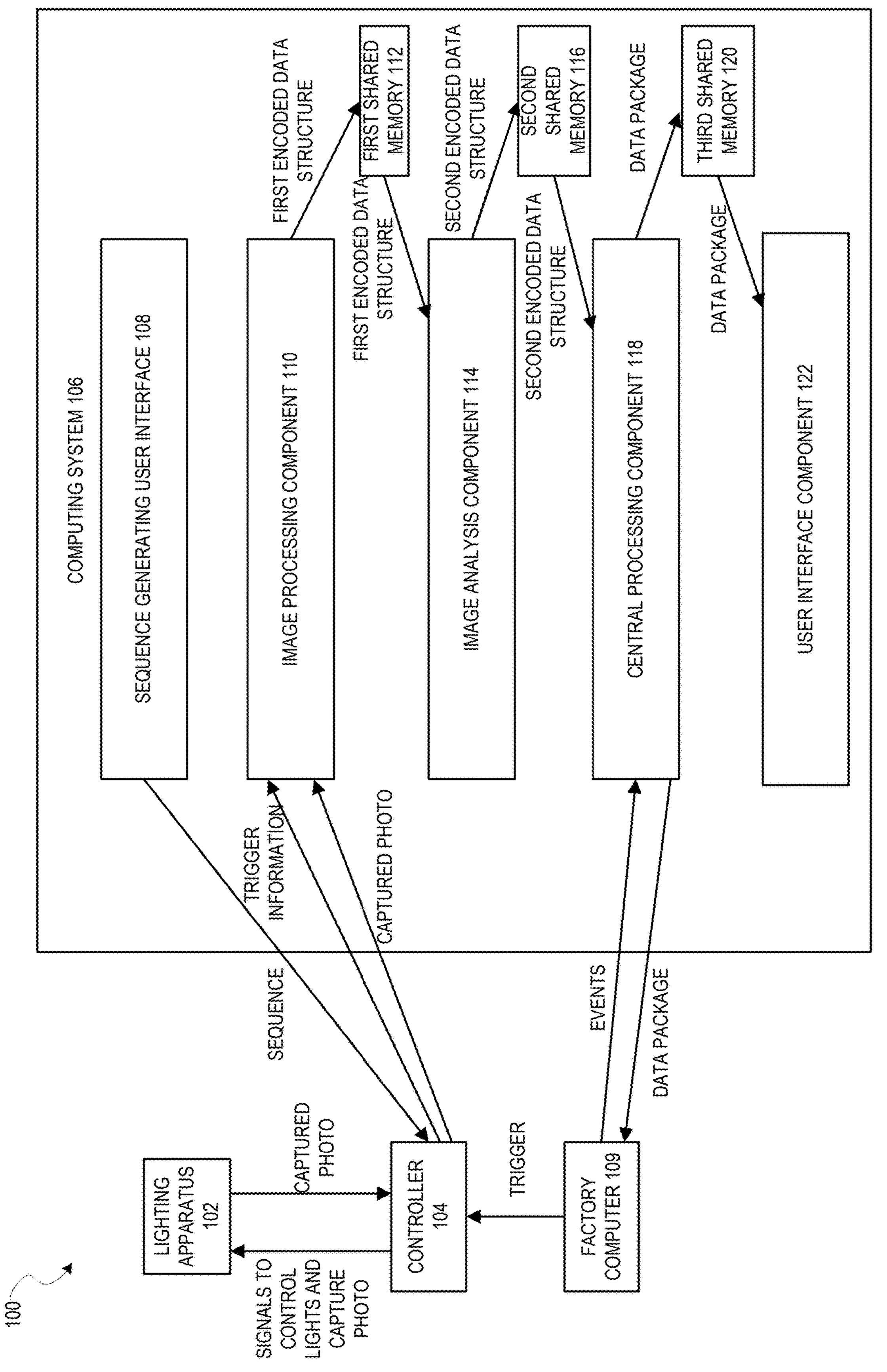
FIG. 1 is a block diagram illustrating an inspection camera system, in accordance with an example embodiment.
Figures 2A, 2B, 2C, 2D, 2E, 2F, 2G, 2H:
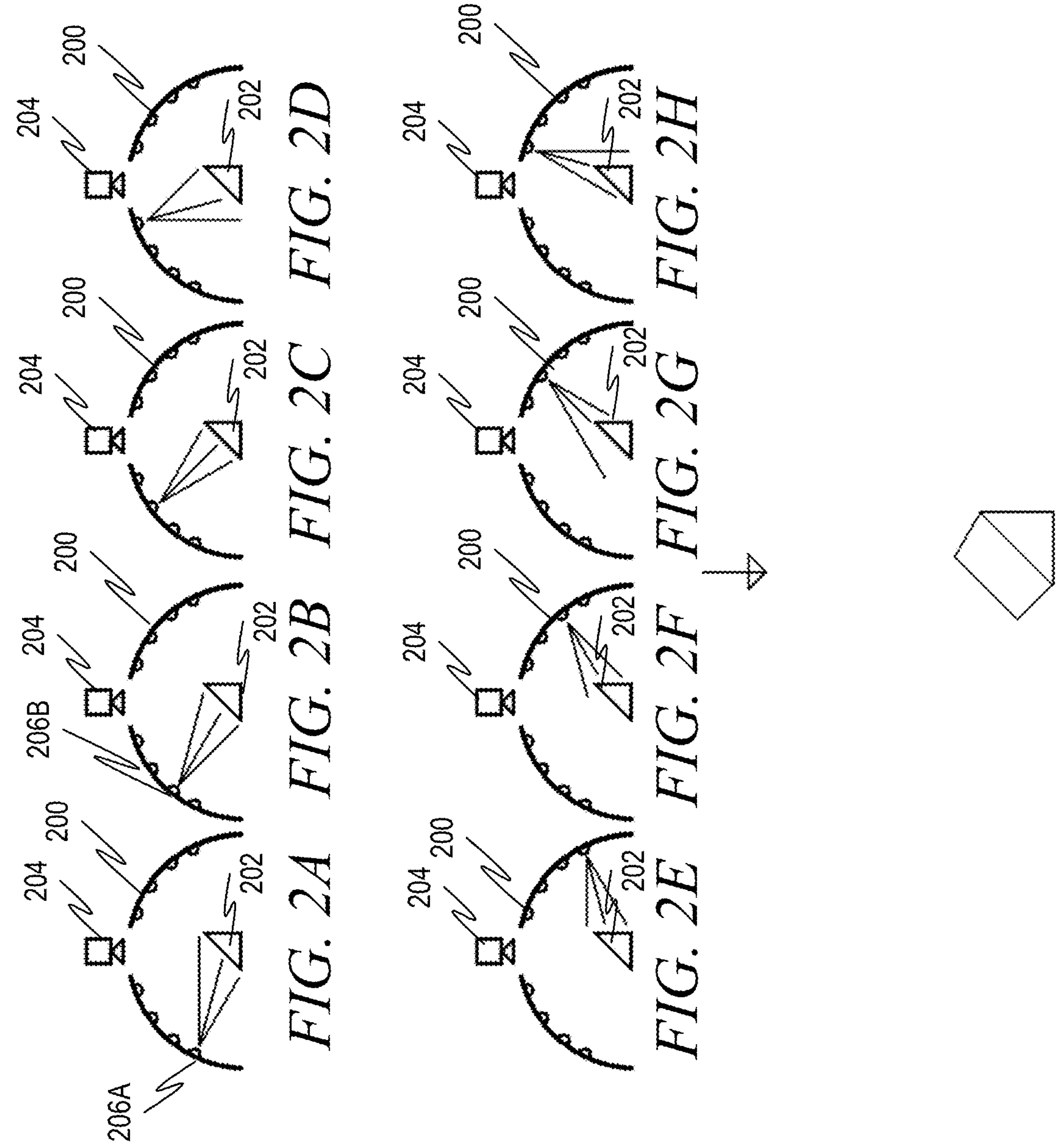
FIGS. 2A-2H are diagrams illustrating a photometric stereo technique using a light dome, in accordance with an example embodiment.

The traditional method for current sensing on multiple LED channels usually implements current sensing and real-time feedback control for every single LED channel circuit. Yet this implementation requires a current sensing circuit for each LED channel. Therefore, the hardware cost increases as the LED channel counts increase. In addition, when multiple LED channels are operating at the same time, real-time control for all channels at the same time throttles the Central Processing Unit (CPU) computing power. Expensive parallel computing hardware and software development are needed for real-time control over multiple LED channels.

Furthermore, a very bright light source is needed in order to aid with high-speed fly capture, and this light source needs to be very consistent in color temperature and brightness. Therefore, a specially designed controller is required to provide accurate current control over each LED channel.

An inspection camera may be improved by improving the design of a lighting apparatus to increase light in various scenarios. More particularly, rather than a single light source, which provides inadequate light for capturing an image with quality sufficient to ascertain the existence of surface defects on all surface materials on various components or products, a lighting apparatus having multiple light sources may be provided. Furthermore, a controller for the lighting apparatus may be provided that allows for the multiple light sources to be independently controlled, allowing for lighting combinations and sequences to be utilized to maximize the flexibility of the lighting apparatus to provide sufficient light for a number of different products, components, materials, and environments.

Managing the various different lighting combinations and sequences, however, creates a technical challenge. There may be many different components in a single assembly or manufacturing line, a variety of different potential defects on the surface, and a variety of different environmental scenarios that might alter the ability of the lighting apparatus to properly produce an image useful for analysis. Furthermore, as the number of different controllable lights on the lighting apparatus increases, the technical challenge becomes exponentially more difficult.

One specific technical problem that is encountered when using fly capture is that light from various sources can cause distortion or inaccuracies in the defect detection process. For example, a flat piece of metal may appear to look more like a dome purely based on some of the distortion appearing from a light at an odd angle. This is an example of what is known as a global inaccuracy, in that it is an inaccuracy that affects at least a large portion of a component being inspected. This makes defect detection difficult, because the systems designed to analyze the scanned images of components will have trouble distinguishing between a global inaccuracy and an actual localized defect. In the example of a flat piece of metal, the system will be unable to distinguish between the dome appearance being from the lighting or other global inaccuracy, or the dome appearance being an actual defect in the component itself. What is needed is a solution that reduces or eliminates these global inaccuracies to enable more accurate defect detection.

The global inaccuracy may not even have to do with a lighting effect or some unintended or "unwanted" aspect of the image capture process. In some instances, the global inaccuracy is a feature of the component itself that makes defect detection more difficult, such as an extreme slope in a plane of the component making it difficult to determine the depth of a hole or bump in that plane.

In an example embodiment, a uniform filtering technique is applied using photometric stereo to reduce or eliminate global defects in a scanned component. An image is taken of a component using a photometric stereo technique. A uniform filter then, for every point in the component, takes an average of heights of the points near it. This essentially "blurs" the image. The blurring may be repeated multiple times. The blurred image may then be subtracted from the original image, essentially flattening out the image in a manner that reduces or eliminates global inaccuracies. The post-filtered image can then be used for defect detection, with that defect detection being more accurate because of the reduction of the global inaccuracies.

FIG. 1 is a block diagram illustrating an inspection camera system 100, in accordance with an example embodiment. The inspection camera system 100 may include a lighting apparatus 102, a controller 104, and a computing system 106. The lighting apparatus 102 includes a plurality of different lights, such as LED lights that are separately controllable by the controller 104. This means that the lights can be turned on and off independently of one another, allowing the lighting apparatus 102 to have some, but not all, of its lights on at any given time. In some example embodiments, the brightness of each of the lights can also be independently controlled, so that a light can have a custom level of brightness/dimness in addition to merely being on or off.

The lighting apparatus 102 further may include one or more cameras. Each of these cameras can also be independently controlled to take pictures/capture images when signaled. Variables such as exposure time can also be independently controlled.

In an example embodiment, the lighting apparatus 102 is a light dome. The light dome in use illuminates a target object, such as a metal casting or other product. The light dome includes a housing containing a number of light sources as will be described in more detail below. In some examples, the light sources comprise a plurality of LEDs or display screens arranged to provide flexibility in illuminating the target object.

The one or more cameras, which may be mounted to the light dome by a bracket, capture images of the illuminated target object through a hole in the top of the light dome.

The controller 104 is an electronic component that is designed to send signals to the lighting apparatus 102 via one or more channels to control the lights on the lighting apparatus 102.

The computing system 106 includes a variety of different software components, running on a computing hardware platform. These components include a sequence generating user interface 108. The sequence generating user interface 108 allows a user to create a sequence as an ordered combination of capture configurations, optionally separated by customized delays. The created sequence may then be stored on the controller 104, such as in a memory component in the controller 104. Upon receipt of an external trigger, the controller 104 then retrieves the sequence and fires the sequence, meaning the capture configurations in the sequence are used to control the lighting apparatus 102 according to the parameters defined in each capture configuration, separated by the custom delays.

The external trigger may be either a hardware trigger (such as from a programmable logic controller) or a software trigger (such as from an industrial personal computer (PC)). In some example embodiments, one or more of the triggers may be received from a factory computer 109. Once the trigger occurs, the sequence fires, which controls the lighting apparatus 102 to light the appropriate lights at the appropriate time and also to trigger the camera or cameras to take pictures/capture images at the appropriate times.

The controller 104 sends information about the trigger, along with a time stamp, to an image processing component 110 on the computing system 106. The controller 104 also receives the photo(s) from the lighting apparatus 102, time stamps them, and sends the timestamped images to the image processing component 110. The image processing component 110 then encodes a data package, which includes photo(s), capture configuration information, timestamps, camera identifications, and other information, in a data structure or data structures, which is/are then stored in first shared memory 112.

An image analysis component 114 then retrieves this data structure and decodes it. The capture configuration information is used to retrieve an artificial intelligence model corresponding to the capture configuration. Each capture configuration has its own artificial intelligence model, although some capture configurations may have more than one artificial intelligence model. In an example embodiment, no artificial intelligence model is shared between or among two or more capture configurations.

The artificial intelligence model acts to use artificial intelligence to perform one or more image analysis tasks on the image(s). These tasks may include, for example, creating a mask for the image that makes one or more inferences on the image regarding one or more defects in components captured in the image.

The image analysis component 114 then encodes the results of these image analysis tasks into another data structure. This data structure may include, for example, inferred masks, network information, and defect types. This data structure is then stored in a second shared memory 116.

A CPU 118 then retrieves the data structure from the second shared memory 116 and performs time stamp sorting on the data in the data structure, using information obtained from the programmable logic controller, such as part identification, inspection identification, inspection ready, part start, part end, and so forth. It then packages the sorted data into a data package that is stored in a third shared memory 120. The data package may include, for example, a part identification, inspection identification, camera identification, image, inference mask, other inference post processing results, error codes, and the like.

A user interface component 122 is then provided that can access the data package in the third shared memory 120 and display portions of it to a user via a graphical user interface. Here, a user may specify an inspection mode (such as manual or automatic), and can also add customer-specific settings, such as image display settings, how and whether to upload the image into a cloud environment, and the like.

It should be noted that in some example embodiments, the user interface component 122 and the sequence generating user interface 108 may be combined into a single component. In other words, the sequence defining capabilities of user interface 108 may be combined with the output and settings-related capabilities of the user interface component 122.

As mentioned earlier, a photometric stereo technique may be utilized in conjunction with a uniform filter to reduce global inaccuracies. Thus, the controller 104 controls the lighting apparatus to take multiple different pictures of the component at times when different lights are triggered (thus under different lighting conditions). The lights may be varied to illuminate the object from multiple different angles. The resultant images are then combined by the image processing component 110 into a single image of the component.

More particularly, during the combining of the resultant images, one or more algorithms may be used to estimate the surface normal of each pixel on an object's surface. The surface normal can then be integrated to reconstruct a three-dimensional representation of the object's shape.

Photometric stereo assumes that the object's surface follows a Lambertian reflectance, meaning that the amount of light reflected from a surface is determined by its orientation relative to the light source and the camera. The camera remains in a fixed position while the light sources change. For each pixel in the images, the intensities across the different images are analyzed. Due to the changing lighting angles, the intensities vary based on the surface orientation of the object at that pixel. Pixels that appear brighter in some images and darker in others indicate changes in surface orientation and curvature.

By analyzing the intensity variations, a photometric stereo technique estimates the surface normal at each pixel on the object's surface. Surface normal are vectors that point outward from the surface and indicate the direction the surface is facing. The relationship between the surface normal, the light direction, and the camera detection is described by Lambert's law, which governs how light is reflected off of a Lambertian surface.

The estimated surface normals are integrated to reconstruct a three-dimensional representation of the object's shape. The integration process involves accumulating the normal to estimate the surface depth. The integration results in a height map that represents the object's surface geometry relative to some horizontal surface. Thus, each surface may be assigned such a height map, which may essentially be a two-dimensional representation of the height at each point along the surface.

This height map may then be filtered using the uniform filtering technique described earlier, to reduce global inaccuracies.

FIGS. 2A-2H are diagrams illustrating a photometric stereo technique using a light dome 200, in accordance with an example embodiment. Each of FIG. 2A-2H depict the light dome 200 at different times, when different light sources within the light dome 200 are illuminated. It should be noted that these figures only depict a two-dimensional representation of the light dome 200 and its effects. In reality, the light dome 200 would be three-dimensional and thus, for example, light would be projecting from multiple directions at once.

Here, a component 202 is placed in the center of the light dome 200. Here the component 202 is a wedge-shaped component. A camera 204 in the top of the light dome 200 takes an image of the component 202 under the various different lighting conditions caused by illuminating the different light sources of the light dome 200. Thus, for example, in FIG. 2A, light source 206A is illuminated while the other light sources are not. Likewise, in FIG. 2B, light source 206B is illuminated, while the other light sources are not.

While not pictured in FIGS. 2A-2H, the component 202 may have one or more defects in it that would be useful to detect. However, various conditions may make this defect difficult to detect. One example of such a condition is an extreme slope in the component 202 itself, such as 45-degree slant. What follows is an example of a component with such a slant.

Figure 3:
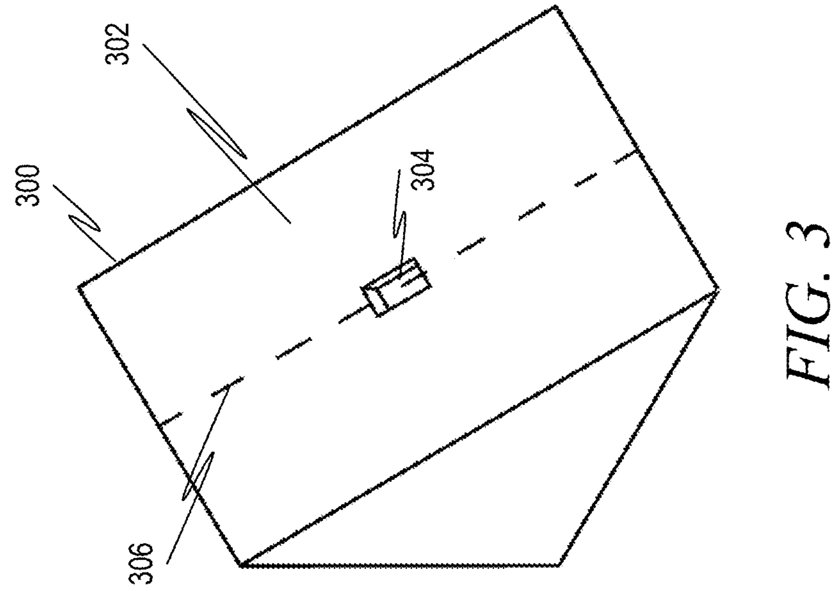
FIG. 3 is a diagram illustrating a component having an extreme slope, in accordance with an example embodiment.

FIG. 3 is a diagram illustrating a component 300 having an extreme slope, in accordance with an example embodiment. Here, component 300 has plane 302, which is at a 45-degree angle relative to the plane on the underside of the component 300. Also present is a lowered region 304, which may represent an indentation or partial hole in the plane 302. The depth of this lowered region 304 may be significantly relevant in determining whether the lowered region 304 is a defect or not (e.g., whether it is "supposed" to be there, or whether the component 300 is defective). But the 45-degree angle makes measurement of the change in depth of this lowered region 304 difficult to calculate, and more specifically the change in depth of the lowered region 304 as reflected in the reconstructed representation after the aforementioned photometric stereo techniques have been applied is difficult to measure.

While the component 300 is three dimensional, the height and depth maps for a surface, such as plane 302, are two-dimensional representations of the depth at each point along the surface. For ease of visualization, the height and depth maps of the component 300 will be depicted in one-dimensional format in the present disclosure. More particularly, the height or depth of each point along axis 306 will be depicted in subsequent figures.

Figure 4A:
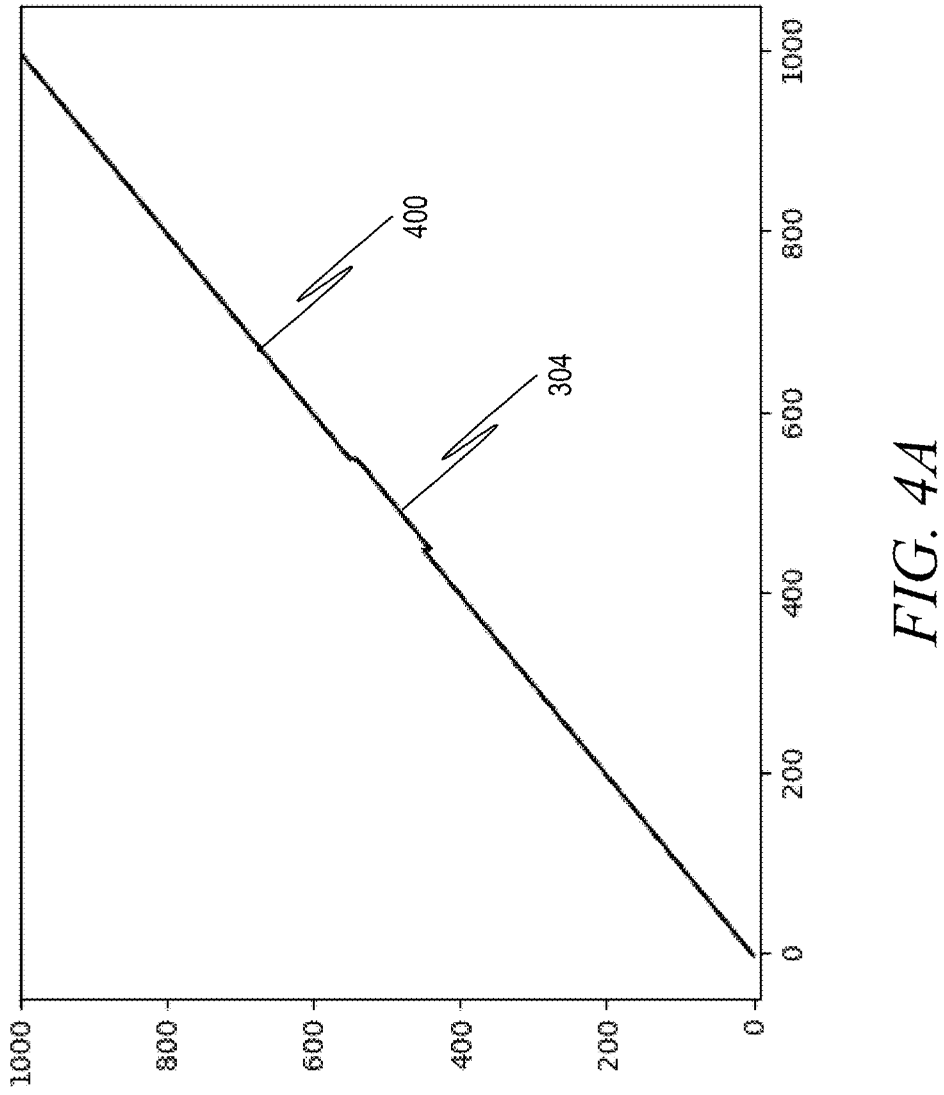
FIG. 4A is a graph depicting a one-dimensional representation of height of a component along an axis.

FIG. 4A is a graph depicting a one-dimensional representation of height of component 300 along axis 306. As can be seen, the slope of line 400 is 45 degrees, just as in the three-dimensional version in FIG. 3. Also visible is the lowered region 304.

Figure 4B:
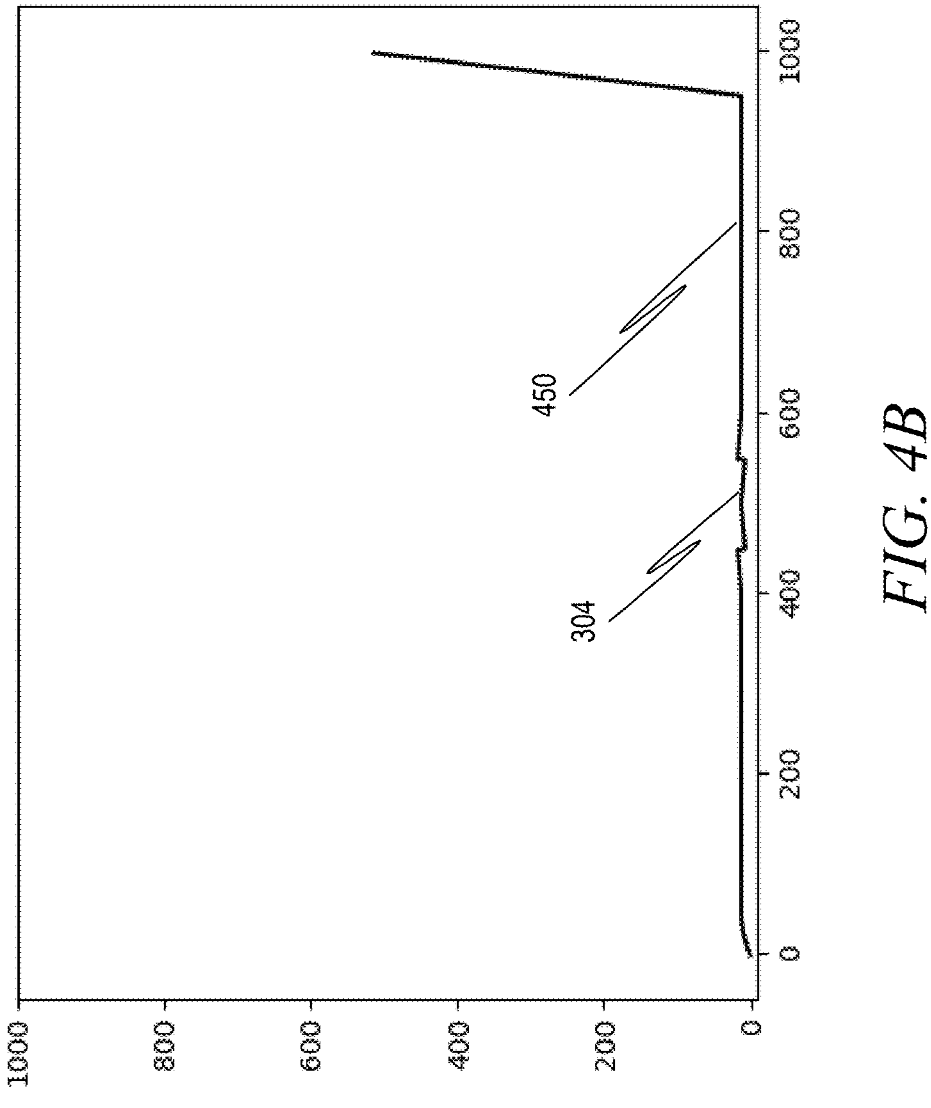
FIG. 4B is a graph depicting a one-dimensional representation of depth of a component along an axis after one iteration of the uniform filtering technique, in accordance with an example embodiment.

The uniform filtering technique described earlier is then applied to the height map. This produces a version of the line 400 that has essentially been "blurred". This version of the line 400 is then subtracted from the line 400, which flattens out the slope. The resultant remainder is the depth of the point, and can be assigned to the point in a depth map for the surface. FIG. 4B is a graph depicting a one-dimensional representation of depth of component 300 along axis 306 after one iteration of the uniform filtering technique, in accordance with an example embodiment. Here, line 450 is essentially the flattened version of line 400, making it easier to accurately measure the change in depth of lowered region 304.

Figure 4C:
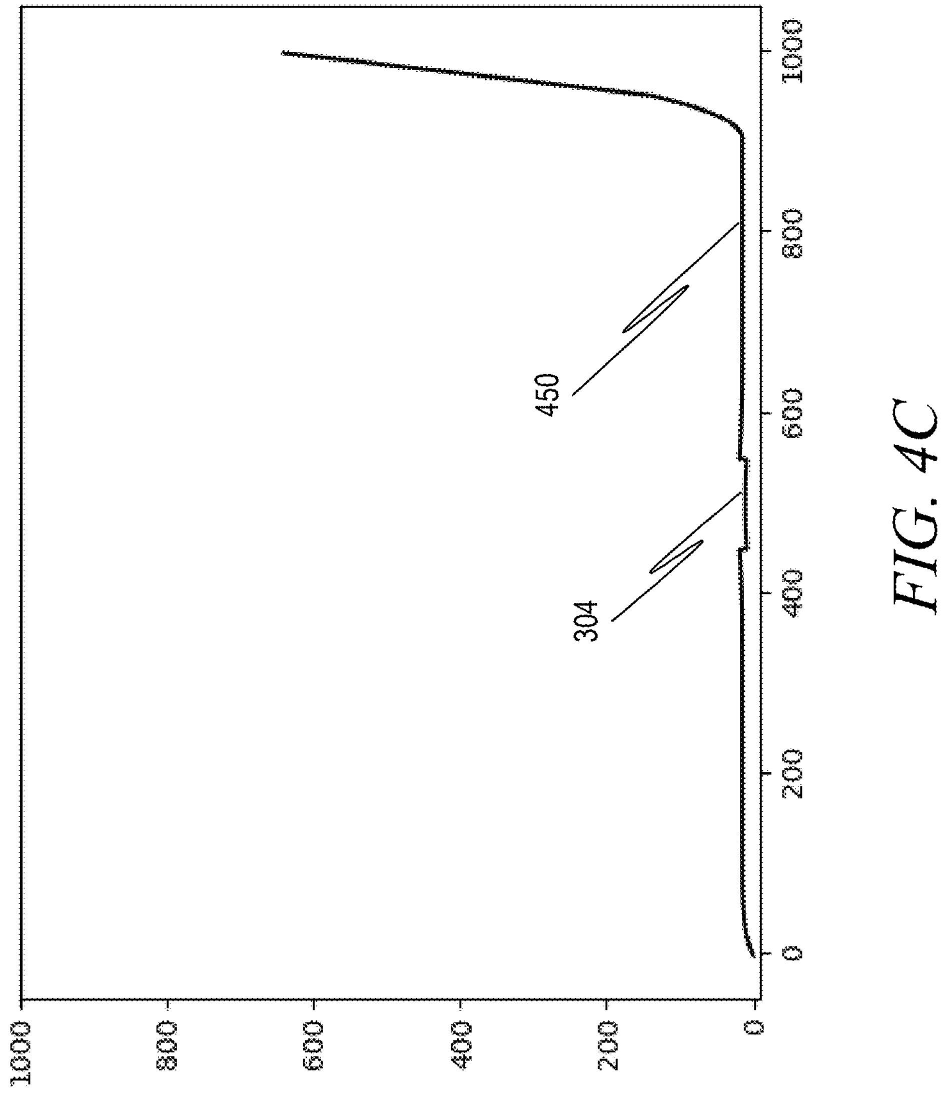
FIG. 4C is a graph depicting a one-dimensional representation of depth of a component along an axis after two iterations of the uniform filtering technique, in accordance with an example embodiment.
Figure 4D:
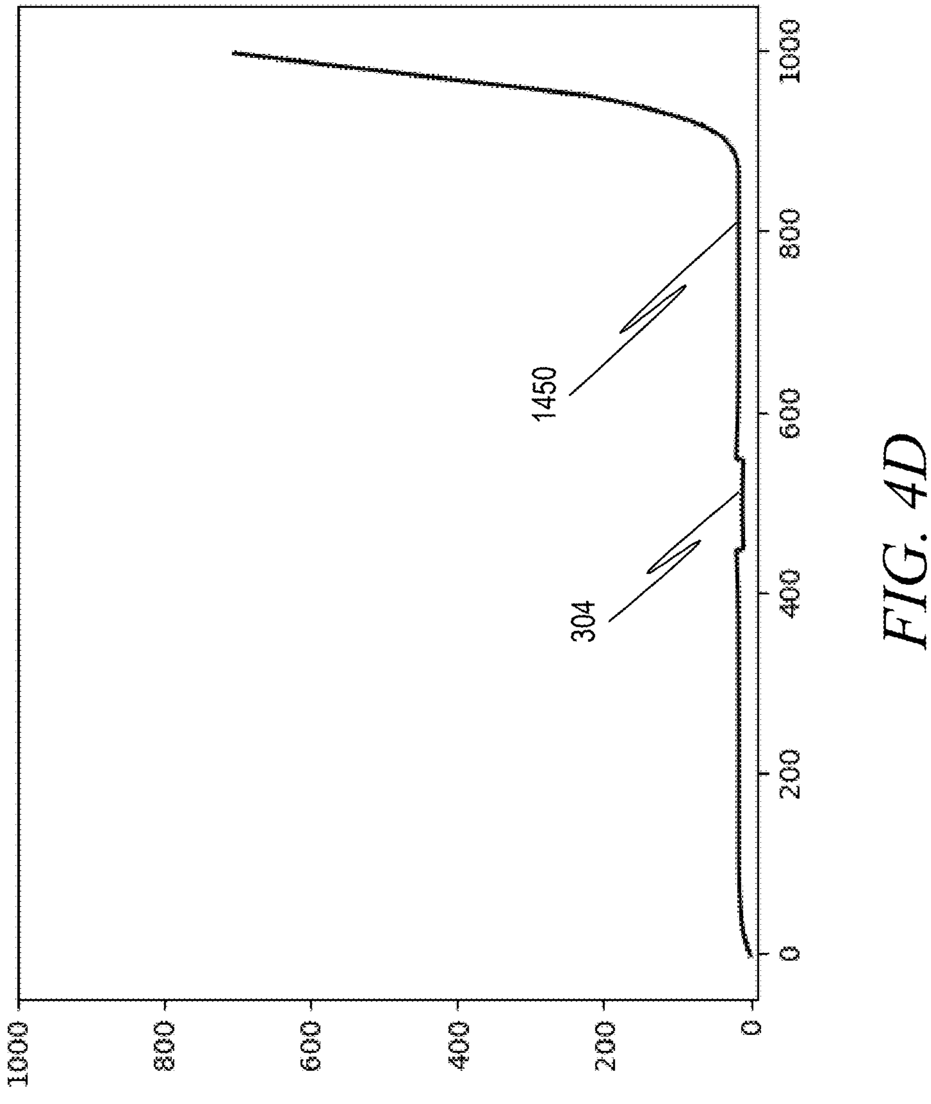
FIG. 4D is a graph depicting a one-dimensional representation of depth of a component along an axis after three iterations of the uniform filtering technique, in accordance with an example embodiment.
Figure 4E:
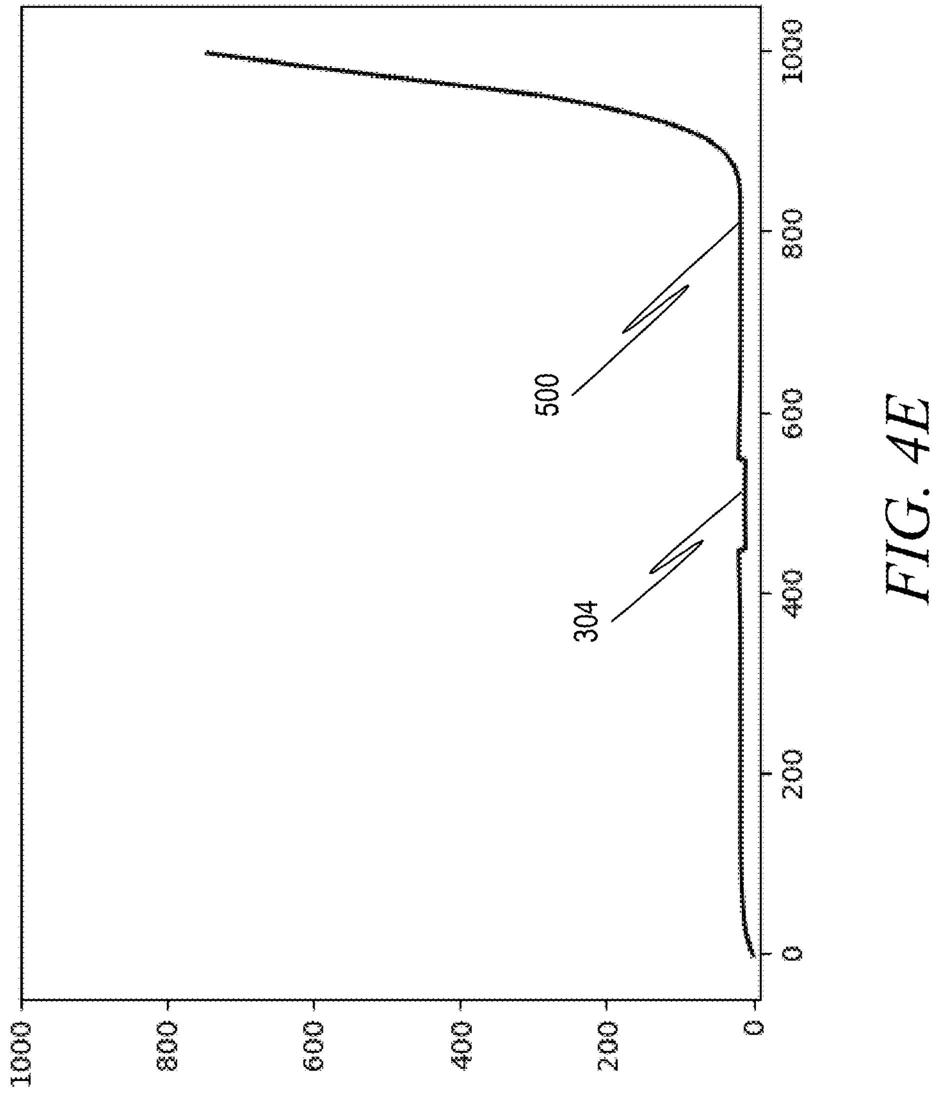
FIG. 4E is a graph depicting a one-dimensional representation of depth of a component along an axis after four iterations of the uniform filtering technique, in accordance with an example embodiment.
Figure 4F:
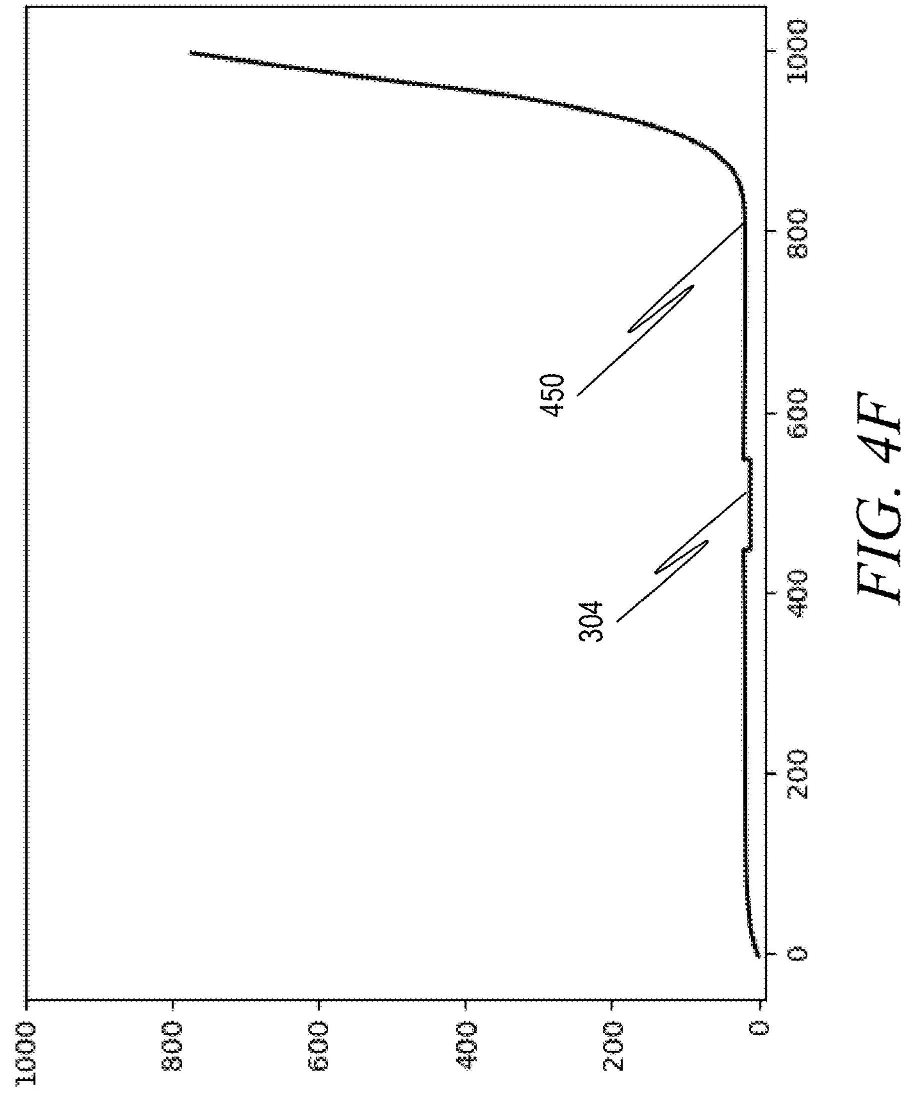
FIG. 4F is a graph depicting a one-dimensional representation of depth of a component along an axis after five iterations of the uniform filtering technique, in accordance with an example embodiment.

The uniform filtering technique can be applied multiple times to enhance this flattening effect and making it even easier to accurately measure the change in depth of lowered region 304. FIG. 4C is a graph depicting a one-dimensional representation of depth of component 300 along axis 306 after two iterations of the uniform filtering technique, in accordance with an example embodiment. FIG. 4D is a graph depicting a one-dimensional representation of depth of component 300 along axis 306 after three iterations of the uniform filtering technique, in accordance with an example embodiment. FIG. 4E is a graph depicting a one-dimensional representation of depth of component 300 along axis 306 after four iterations of the uniform filtering technique, in accordance with an example embodiment. FIG. 4F is a graph depicting a one-dimensional representation of depth of component 300 along axis 306 after five iterations of the uniform filtering technique, in accordance with an example embodiment.

The uniform filtering technique may apply one of many different types of blurring techniques in its first step, prior to subtracting the result of the blurring technique from the last version of the depth map for that surface, at each iteration. One such blurring technique is a box blur. In a box blur, a square region of points (a "box" immediately around the point as well as the point) are taken, and the heights of all of these points is averaged and assigned to the point of interest. Thus, for example, if a first point has height of 9 in the depth map and each of the 8 points surrounding that first point in the two-dimensional depth map has a height of 3, then the first point will be assigned a height of 3.6 ((9+3+3+3+3+3+3+3+3)/9). Then the assigned height of each point is subtracted from the earlier version of the depth map. Thus, for example, the last version of the depth map had a height of 9 for the first point, and the result of the box blur in this iteration results in an assigned height of 3.6 for the first point. As a result, the resulting version of the depth map assigns a height of 5.4 to the first point (9−3.6).

It should be recognized that box blur is merely one type of blurring technique that can be used for the blurring portion of the uniform filtering technique. Other blurring techniques could be used in other example embodiments, and some of these techniques will be described now.

In a Gaussian blur 3×3, a weight is assigned to each of the points based on a Gaussian distribution. Thus, for example, the first point may be assigned a weight of 4, the points surrounding the first point in the horizontal and vertical directions on the plane are assigned a weight of 2, and the points surrounding the first point diagonally are assigned a weight of 1. A weighted average is then computed by individually multiplying the weights by the heights of their corresponding points in the depth map, and the products of these multiplications are then added and the resultant sum divided by 16 (the total of all the weights). The resultant quotient is then assigned to the first point in the depth map.

In a Gaussian blur 5×5, rather than just the immediately surrounding points being considered, the points within 2 or fewer points of the point of interest are considered, essentially enlarging the "box" from 3×3 to 5×5. These points are also assigned according to a Gaussian distribution, as follows, with the first point having a weight of 36:

| | | | | |
|---|---|---|---|---|
| 1 | 4 | 6 | 4 | 1 |
| 4 | 16 | 24 | 16 | 4 |
| 6 | 24 | 36 | 24 | 6 |
| 4 | 16 | 24 | 16 | 4 |
| 1 | 4 | 6 | 4 | 1 |

The result of the above process is that the depth map is flattened and global inaccuracies are reduced. Another advantage occurs in that change in the depth measurement itself can become more accurate, especially with respect to surface variations (e.g., raised or lowered portions) in curved surfaces. Say, for example, there is what looks like a scratch in a round portion of a component. Because the curve goes down, however, it can be difficult to know what plane to measure the change in depth of the "scratch" from. Using the aforementioned photometric stereo and uniform filtering techniques, the curve is flattened, making the change in depth measurement much more accurate. This is depicted in FIGS. 5A-5F.

Figure 5A:
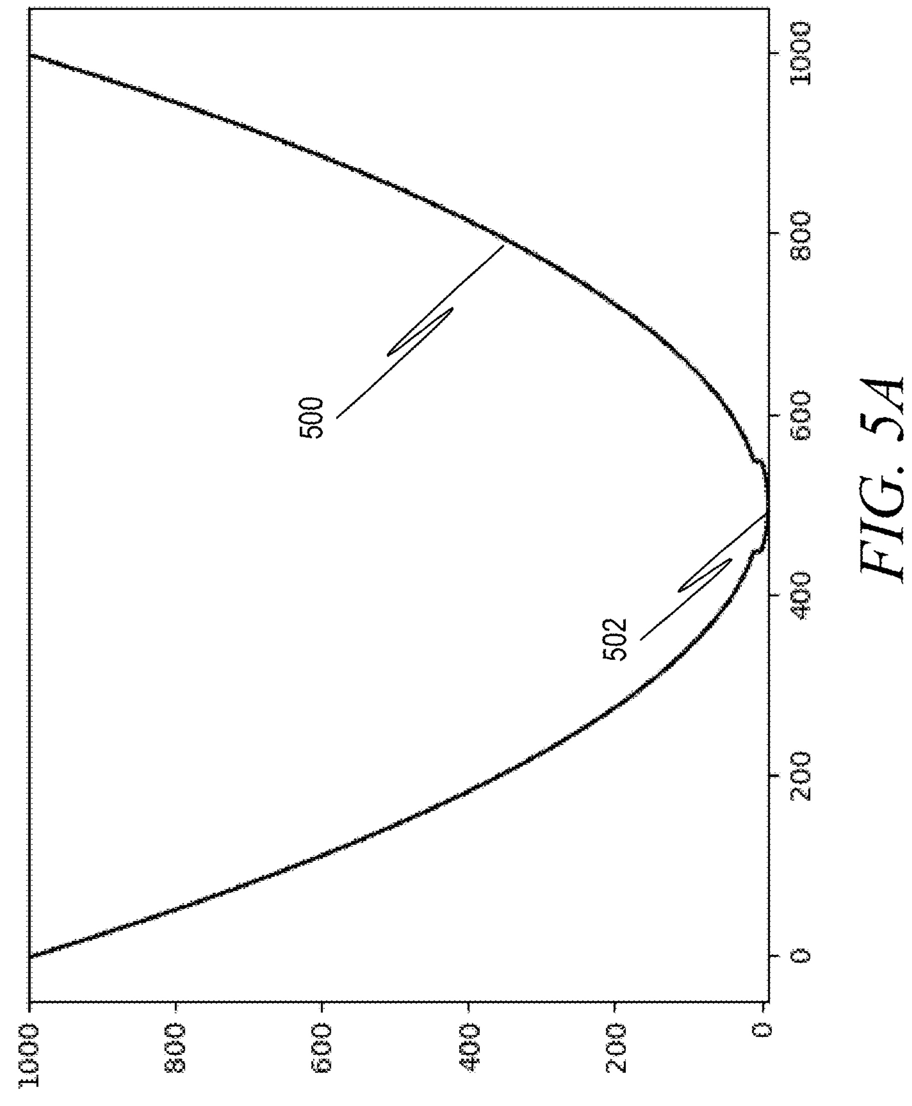
FIG. 5A is a graph depicting a one-dimensional representation of height of a curved component along an axis.

FIG. 5A is a graph depicting a one-dimensional representation of height of a curved component along an axis. As can be seen, the surface 500 is curved. Also visible is a lowered region 502.

Figure 5B:
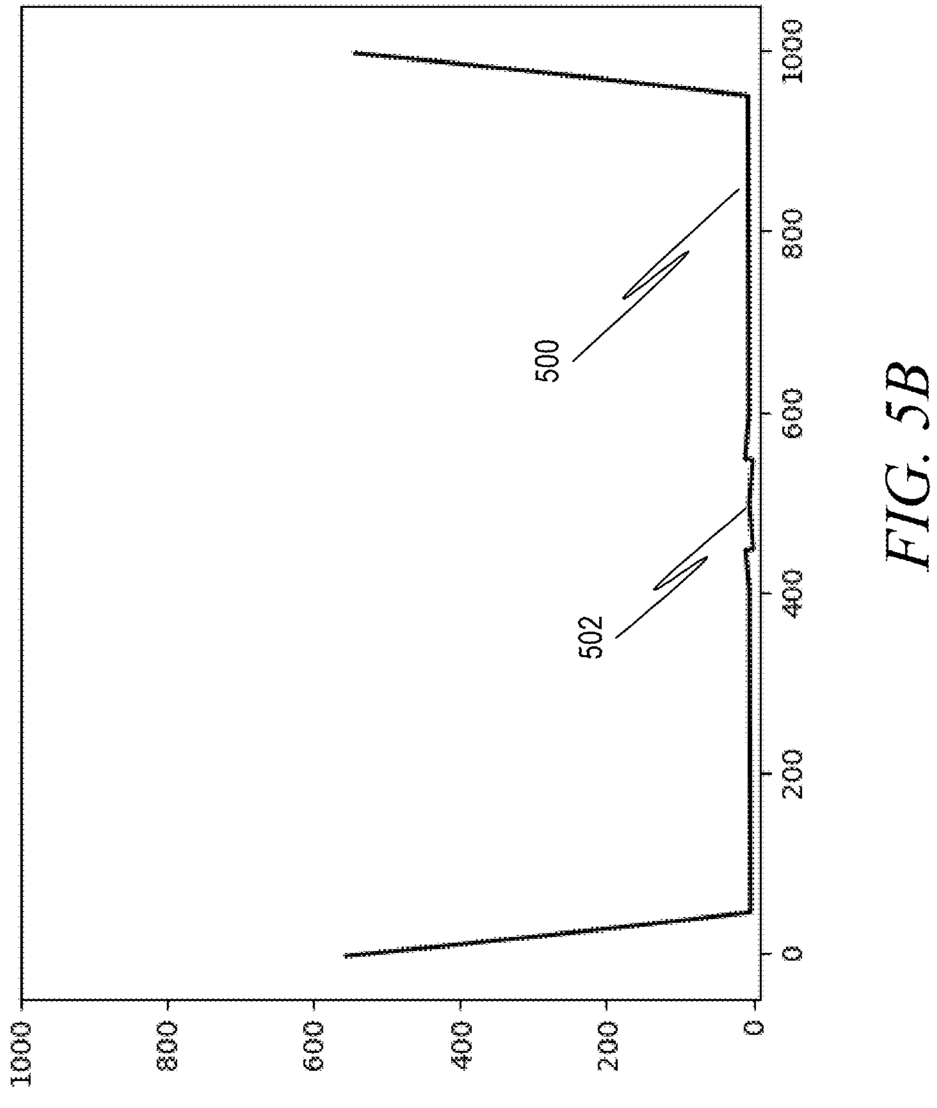
FIG. 5B is a graph depicting a one-dimensional representation of depth of the curved component along an axis after one iteration of the uniform filtering technique, in accordance with an example embodiment.

The uniform filtering technique described earlier is then applied to the height map. Again, this produces a version of the surface 500 that has essentially been "blurred". This version of the surface 500 is then subtracted from the surface 500, which flattens the surface 500. The resultant remainder is the depth of the point, and can be assigned to the point in a depth map for the surface 500. FIG. 5B is a graph depicting a one-dimensional representation of depth of the curved component along an axis after one iteration of the uniform filtering technique, in accordance with an example embodiment. Here, surface 500 is essentially the flattened version, making it easier to accurately measure the change in depth of lowered region 502.

Figure 5C:
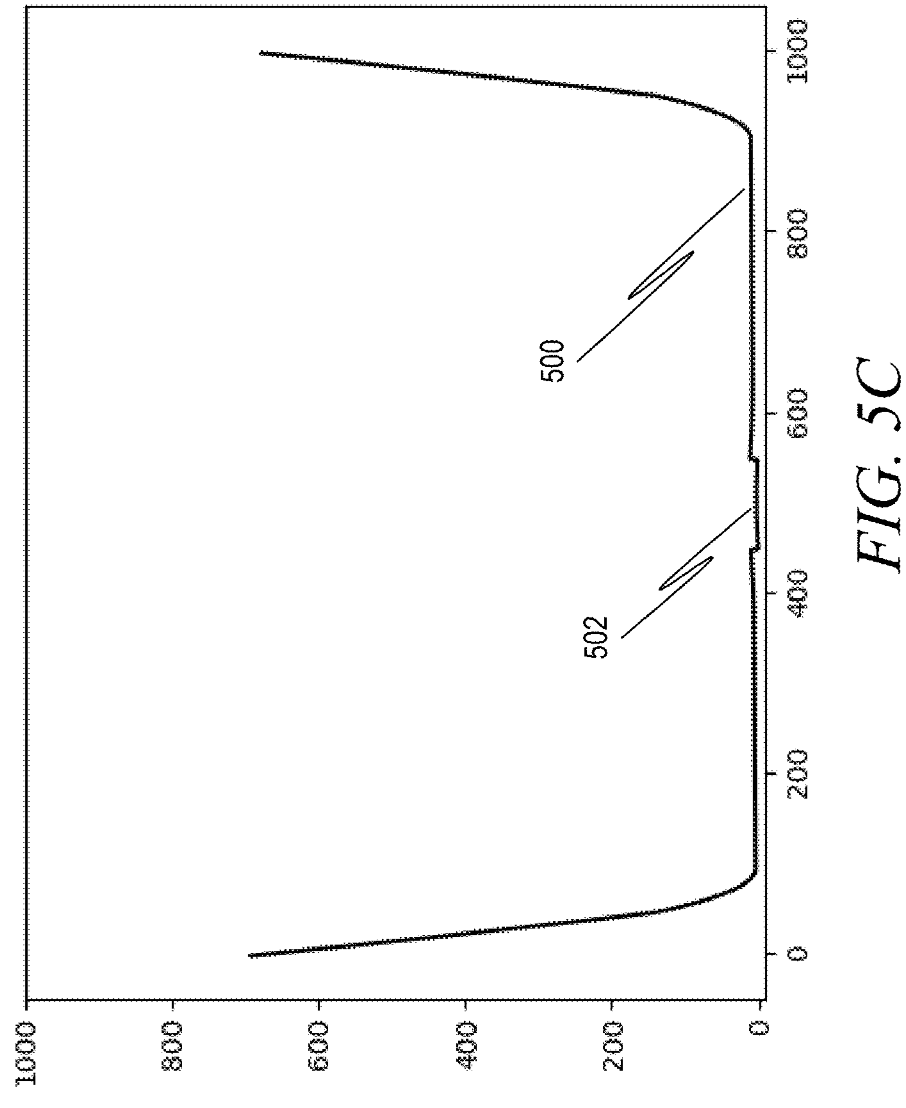
FIG. 5C is a graph depicting a one-dimensional representation of depth of the curved component along an axis after two iterations of the uniform filtering technique, in accordance with an example embodiment.
Figure 5D:
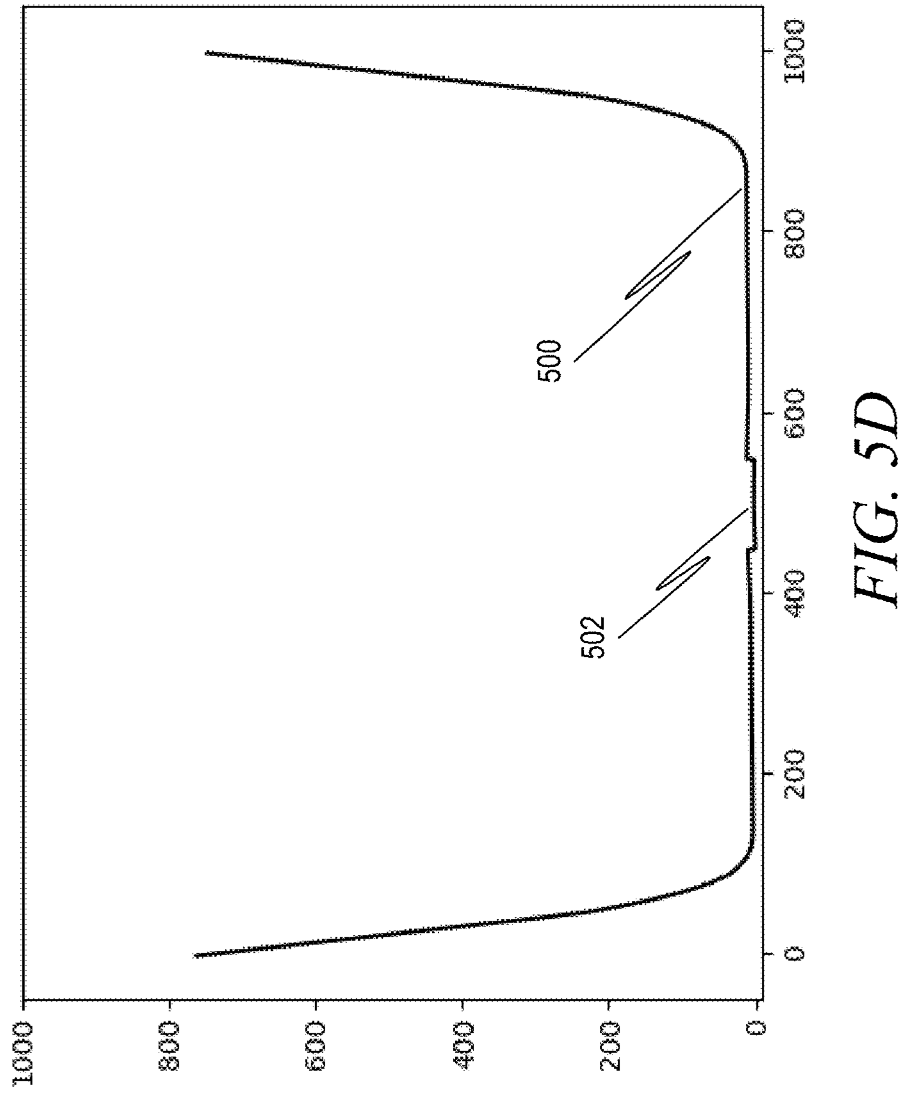
FIG. 5D is a graph depicting a one-dimensional representation of depth of the curved component along an axis after three iterations of the uniform filtering technique, in accordance with an example embodiment.
Figure 5E:
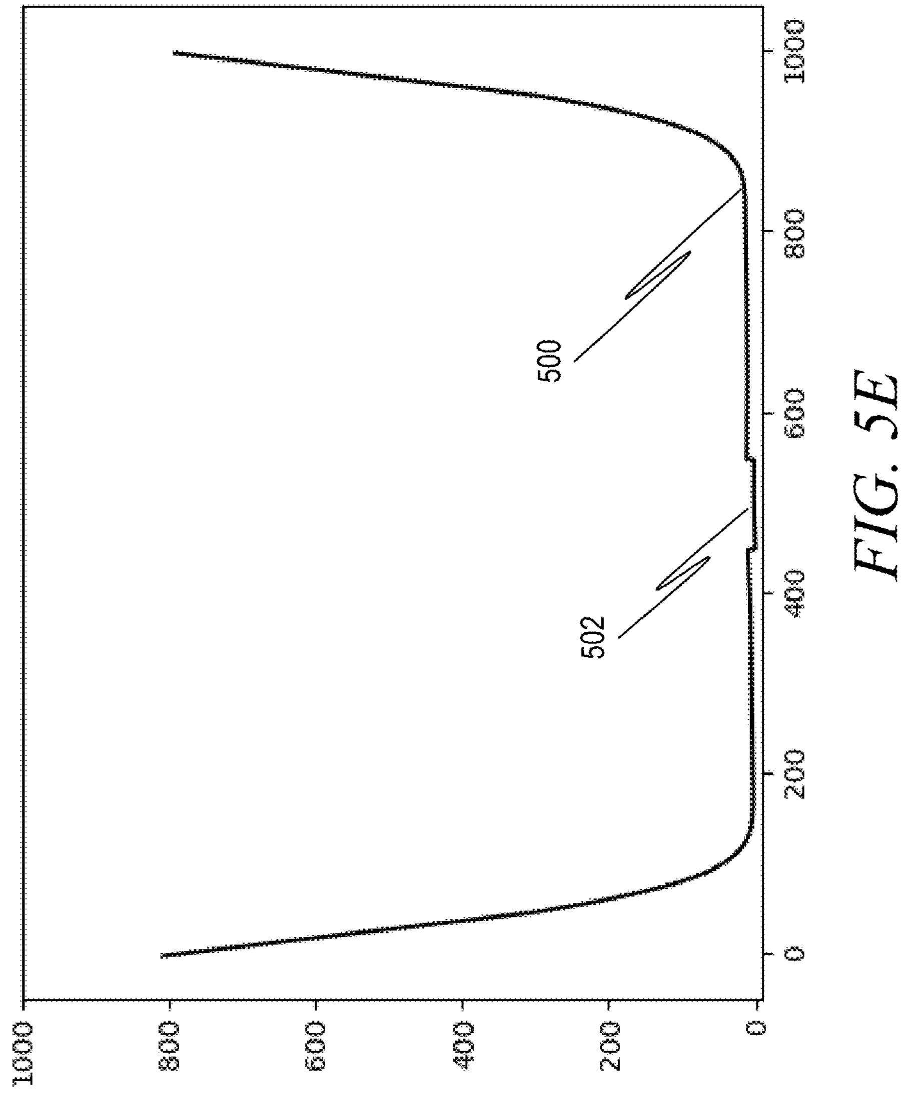
FIG. 5E is a graph depicting a one-dimensional representation of depth of the curved component along an axis after four iterations of the uniform filtering technique, in accordance with an example embodiment.
Figure 5F:
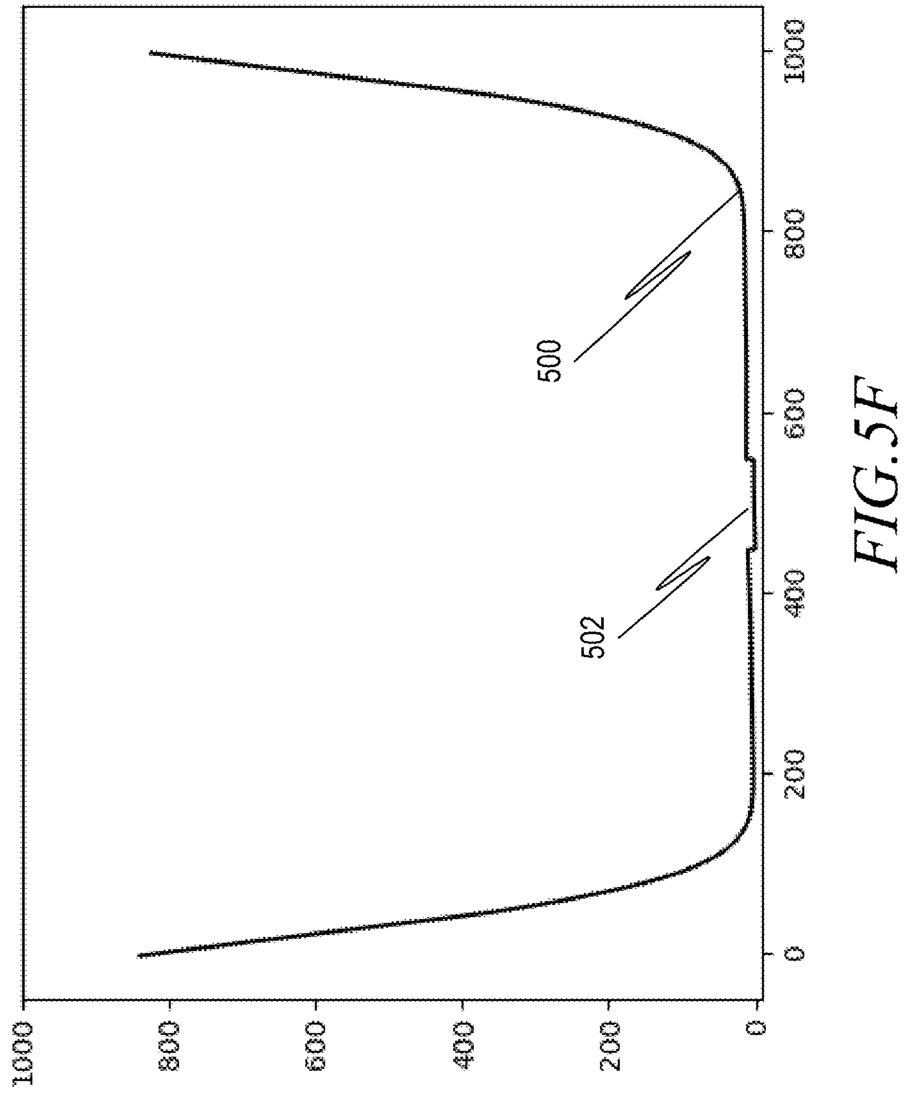
FIG. 5F is a graph depicting a one-dimensional representation of depth of the curved component along an axis after five iterations of the uniform filtering technique, in accordance with an example embodiment.

The uniform filtering technique can be applied multiple times to enhance this flattening effect and making it even easier to accurately measure the change in depth of lowered region 502. FIG. 5C is a graph depicting a one-dimensional representation of depth of the curved component along an axis after two iterations of the uniform filtering technique, in accordance with an example embodiment. FIG. 5D is a graph depicting a one-dimensional representation of depth of the curved component along an axis after three iterations of the uniform filtering technique, in accordance with an example embodiment. FIG. 5E is a graph depicting a one-dimensional representation of depth of the curved component along an axis after four iterations of the uniform filtering technique, in accordance with an example embodiment. FIG. 5F is a graph depicting a one-dimensional representation of depth of the curved component along an axis after five iterations of the uniform filtering technique, in accordance with an example embodiment.

Once the height map has been flatted into a depth map using the above techniques, then depth measurement and defect detection operations can be performed. Specifically, the change in depth of any feature of interest in the depth map can be measured, and this measurement may be used to detect defects (such as if the change in depth is significantly different than an expected change of depth, such as from an ideal version of the component). Either or both of these operations may involve using a neural network.

Images from an image data source may be used to train the neural network by augmenting the training images with one or more labels. This may involve transforming the images to a different format to accept such labels. The labels added may depend on what the neural network is being trained to do, and specifically may correspond to classifications that the neural network is expected to perform. For example, if an image shows an example of a defect in a particular component, it may be labeled as such so that the neural network can learn what a defect in that particular component looks like. This is an example of a positive label. Additionally, if an image shows an example of the component without a defect, it may be labeled as such so that the neural network can learn what a non-defective component looks like. This is an example of a negative label. While these examples are binary (e.g., either positive or negative), in reality the labels may have any number of values depending on the classifications being performed by the neural network.

In an example embodiment, the neural network is a Deep Convolutional Neural Network (DCNN). A DCNN is a machine-learning model that effectively infers non-linear relationships between a homogeneous input field and desired outputs, which are either categorical classes or scalars. The DCNN is a model that maps inputs to outputs using a sequence of so-called convolutional layers of artificial neurons. The DCNN may be trained by presenting it with a large number (e.g., greater than 10,000) of sample data and labels. It is trained to minimize the discrepancy (or "loss") between the model's output and the desired output.

The DCNN is designed to learn not only to classify images or groupings of images, but also to learn a feature hierarchy by defining a number of layers. The process of inference involves taking a given input, applying a sequence of mathematical functions called layers, and calculating the functions on the input data. Each layer extracts features from the output of a previous layer, and all layers are trained jointly. The layer-based architecture is why it is termed a "deep" convolutional neural network.

Figure 6:
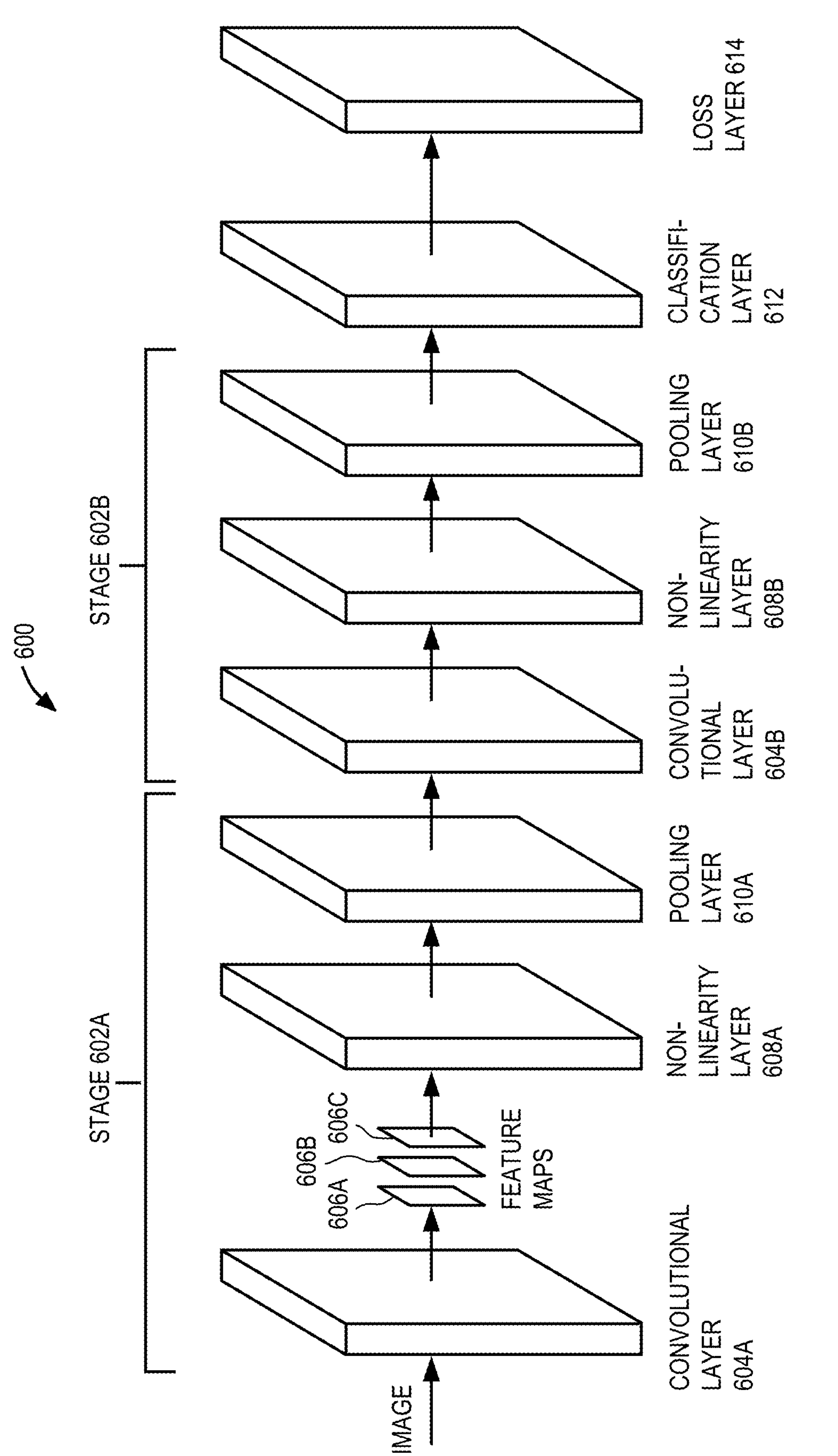
FIG. 6 is a diagram illustrating a Deep Convolutional Neural Network (DCNN), in accordance with an example embodiment.

In an example embodiment, five different types of layers are utilized. The first four layers are the convolutional layer, the nonlinearity layer, the pooling layer, and the classification layer (although the classification is just a special case of convolution followed by "softmax"). These first four layers may be considered to be a stage, and the DCNN may actually be designed to have any number of these stages. Once the stages are all complete, a loss layer is used. FIG. 6 is a diagram illustrating a DCNN 600, in accordance with an example embodiment. Here, two stages 602A, 602B are depicted.

Convolutional layers 604A, 604B are the core of the DCNN 600. Their parameters include a set of learnable filters that have a small receptive field but extend through the full depth of the input data. During a forward pass in a convolutional layer 604A, 604B, each filter is convolved across the features, computing the dot product between the entries of the filter and the input and producing a two-dimensional activation map of that filter. As a result, the DCNN 600 learns filters that activate when they see some specific type of feature.

The feature maps for all filters can be stacked along the depth dimension to form the full volume output of the convolutional layers 604A, 604B.

The convolutional layers 604A, 604B apply mathematical operations called convolutionals. For two spatial dimensions and an indeterminate amount of non-spatial dimensions (referred to as "channels"), the convolutional is defined using the * operator as follows:

$$y[n, m, d] = x * f = \sum_{o} \sum_{j=-M,k=-N}^{j=M,k=N} x[n, m, o] f_d[n-k, m-j, o]$$

The convolutional layers 604A, 604B will typically have some very small support, e.g., N=1 and M=1, such that g [n, m, d]=0 if |n|>1 or |m|>1.

It should be noted that the filters used in the convolutional layers 604A, 604B may be activated in a first iteration of the DCNN 600 and refined prior to each additional iteration, based on actions taken in other layers in the previous iteration, until some error term is minimized below a particular threshold. In one example embodiment, this may be accomplished through back propagation, which is described in more detail below.

The output of the convolutional layers 604A, 604B are sets of arrays called feature maps 606A-606C. Each feature map 606A-606C may be produced by a different filter and modified based on various functions in each stage. At the output, each feature map 606A-606C represents a particular feature extracted at all locations on the input and conditioned. The example in FIG. 6 is of a two-stage system, although one of ordinary skill in the art will recognize that more or fewer stages could be used while still being consistent with the present disclosure, and indeed as will be seen in an example embodiment, the number of stages may be dynamically determined at runtime to optimize results.

Nonlinearity layers 608A, 608B give the DCNN 600 greater expressive power in uncovering nonlinear relationships between input and output. Many different nonlinearities could be used in the nonlinearity layer, including sigmoid, tan h, and rectified linear function. For brevity, one example of nonlinearity will be described here: the rectified linear function. This function is defined by the following:

$$y(x) = \begin{cases} x & \text{if } x > 0 \\ 0 & \text{if } x < 0 \end{cases}$$

Pooling layers 610A, 610B are applied to lower the input image's spatial dimensions while preserving some information from the input image. In other words, the pooling layers 610A, 610B do not actually do any of the learning, i.e., they are a fixed, predefined operation that does not change as training progresses. Instead, they are used as the spatial dimensions of the problem. In one example embodiment, a decimation approach could be followed, where one out of every N samples along a spatial dimension is kept out. In another example embodiment, some local statistics may be used for pooling, such as max pooling, defined as:

$$Y[n, m, d] = \max_{|n'|<N, |m'|<M} x[n+n', m+m', d]$$

where N=M=2.

When all the stages 602A, 602B are complete, a classification layer 612 is used to classify the image using the output of the final pooling layer 610B. As stated above, the classification layer 612 is actually a specialized convolutional layer containing a filter designed to produce the score from the volume output of the final pooling layer 610B. This filter applies a classification function having weights that may be refined in the same manner as the weights in the functions of the filters of the normal convolutional layers 604A, 604B.

Back propagation involves calculating a gradient of a loss function (defined later) in a loss layer 614, with respect to a number of weights in the DCNN 600. The gradient is then fed to a method that updates the weights for the next iteration of the training of the DCNN 600 in an attempt to minimize the loss function, which uses a different plurality of sample data (unless there is a need to repeat, such as running out of sample data). Back propagation uses the labeled sample data in a batch of sample data that have been passed through the stages 602A, 602B in order to calculate the loss function gradient for the samples as a group (although, as will be seen later, the loss function may be modified dynamically to eliminate some of the samples from consideration).

Back propagation may include two aspects: propagation and weight update. In the propagation aspect, forward propagation of a training pattern's input images is performed through the DCNN 600 in order to generate the propagation's output activations (i.e., the images are passed through the stages 602A, 602B). Then, backward propagation of the propagation's output activations are performed through the DCNN 600 using a target specified by the training pattern in order to generate the deltas of all output.

In the weight update aspect, for each weight of each filter, the output delta and input activation are multiplied to obtain the gradient of the weight, and then a ratio of the gradient is subtracted from the weight. The ratio influences speed and quality of learning. The higher the ratio, the faster the training, but at the expense of accuracy.

Thus, these two aspects, including both the forward pass and the backward pass through the stages 602A, 602B, are performed repeatedly until the error rate is below a particular threshold. An example of back propagation algorithms compatible with the DCNN 600 include, for example, gradient descent.

The use of the back propagation may be predicated on whether the combined error of the classification of the images in the batch of labeled sample data transgressed a preset error threshold. If the combined error is too great, then back propagation should occur to update and hopefully minimize the error for the next iteration, and a next iteration is performed with a subsequent batch of labeled sample data, until the combined error does not transgress the threshold.

As described above, the classification may be scored for the data. The DCNN 600 outputs a vector that may be compared to the desired output of some loss function, such as the sum square error function:

$$\text{loss} = \sum_i (\hat{l}_i - l_i)^2$$

Figure 7:
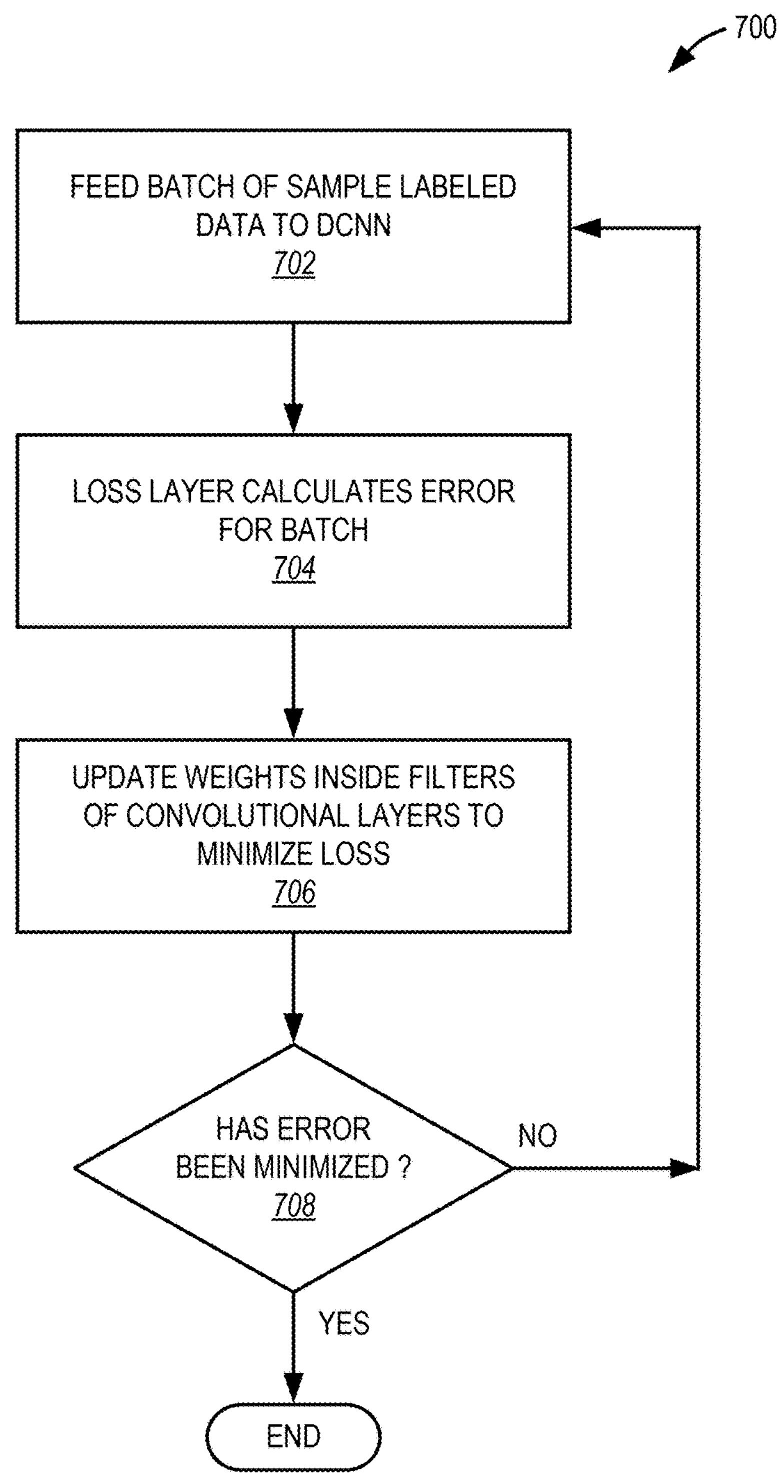
FIG. 7 is a flow diagram illustrating a method of training a DCNN, in accordance with an example embodiment.

FIG. 7 is a flow diagram illustrating a method 700 of training a DCNN 600, in accordance with an example embodiment. At operation 702, a batch of sample labeled data are fed to the DCNN 600 and the current model of the DCNN 600 produces an output. This output may be, for example, a score for each sample labeled datum. At operation 704, the loss layer 614 of the DCNN 600 calculates the error for the batch of sample data. This error may be, for example, a combination of the individual errors for each of the individual sample labeled data. At operation 706, weights inside the filters in the convolutional layers 604A, 604B (which also include the classification layer 612) are updated to minimize the loss, in accordance with the loss function defined in the loss layer 614. At operation 708, it is determined if the error has been minimized, based on a defined validation set. This defined validation set may include an error threshold, and if that error threshold has been transgressed, then the error has not been minimized and the process repeats back to operation 702 for the next batch of sample labeled images. If the error has been minimized (the threshold has not been transgressed), then the DCNN has been trained.

FIG. 8 is a flow diagram illustrating a method 800 of performing photometric stereo with uniform filtering, in accordance with an example embodiment. At operation 802, a camera is used to capture multiple images of a component, each image being lit by a different light source of the plurality of independently controllable light sources. At operation 804, photometric stereo is applied to the multiple images to estimate surface height of each point along a surface of the component, relative to a horizontal line in each of the multiple images. The applying produces a two-dimensional height map indicating the surface height of each point along the surface of the component.

At operation 806, the first version of the two-dimensional height map is blurred using a blurring technique, producing a first blurred version of the two-dimensional height map. At operation 808, the first blurred version is subtracted from the first version of the two-dimensional height map, resulting in a two-dimensional depth map of the surface. At operation 810, the blurring and subtracting are repeated at least once using the depth map, producing a final version of the two-dimensional depth map.

At operation 812, change in depth of a feature of the surface of the component is measured in the final version of the two-dimensional depth map. At operation 814, the change in depth of the feature is used to determine whether the feature is a defect in the component.

Figure 9:
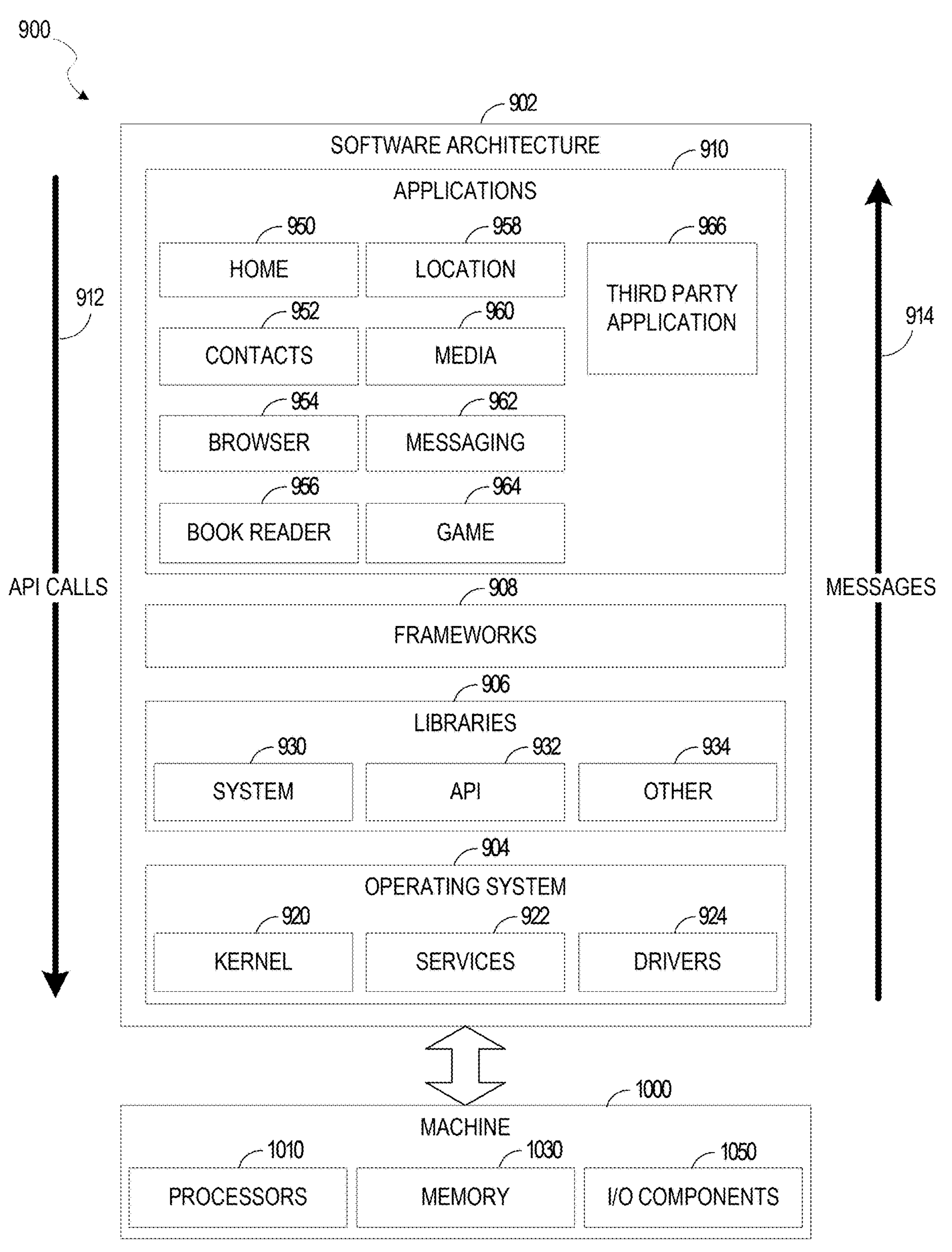
FIG. 9 is a block diagram illustrating a software architecture, which can be installed on any one or more of the devices described above.

FIG. 9 is a block diagram 900 illustrating a software architecture 902, which can be installed on any one or more of the devices described above. FIG. 9 is merely a non-limiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example architecture, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke Application Program Interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware. For instance, the drivers 924 can include display drivers, camera drivers, BLUETOOTH® or BLU- ETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910. For example, the frameworks 908 provide various graphical user interface functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. The applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 966 can invoke the API calls 912 provided by the operating system 904 to facilitate functionality described herein.

Figure 10:
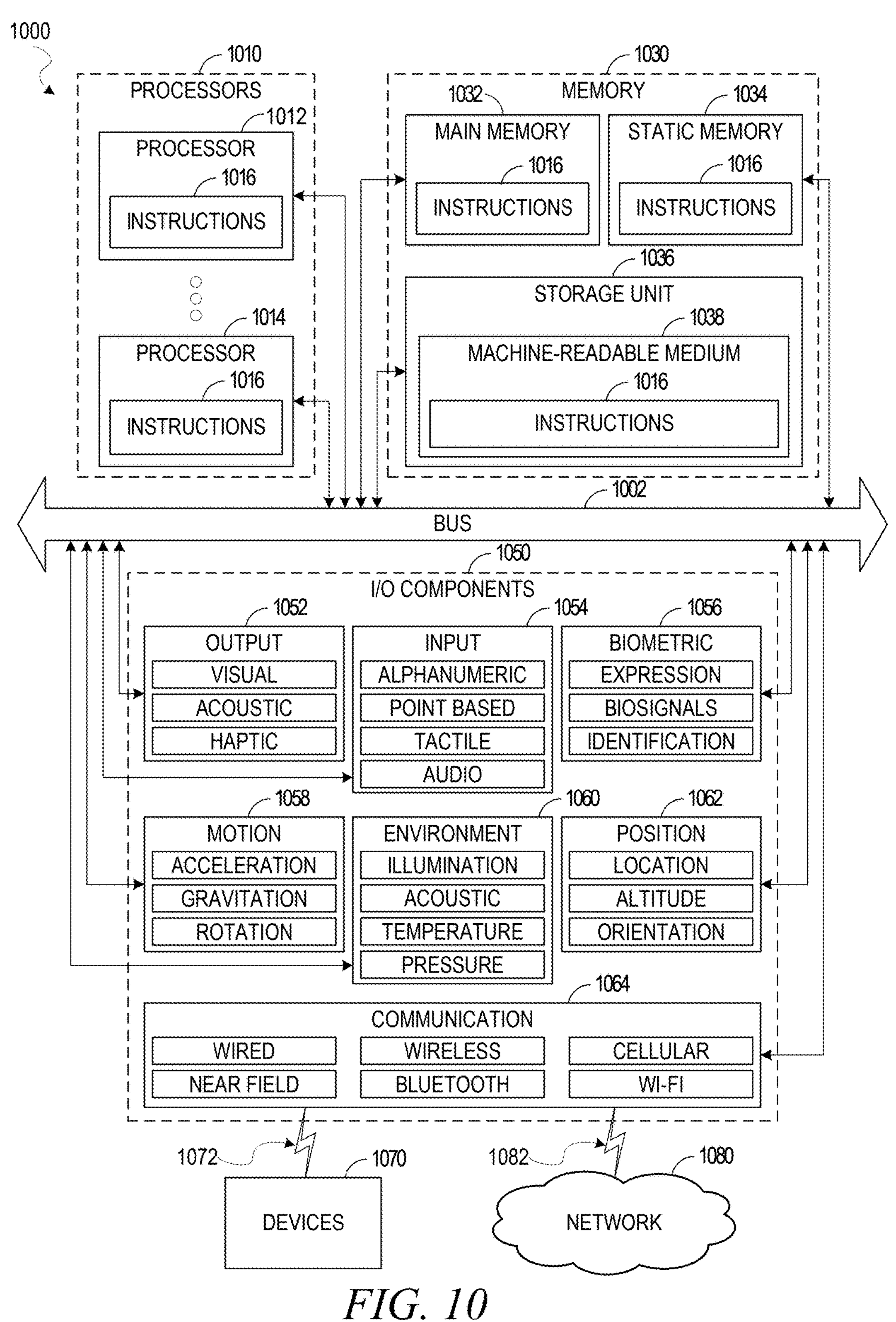
FIG. 10 illustrates a diagrammatic representation of a machine in the form of a computer system within which a set of instructions may be executed for causing the machine to perform any one or more of the methodologies discussed herein.

FIG. 10 illustrates a diagrammatic representation of a machine 1000 in the form of a computer system within which a set of instructions may be executed for causing the machine 1000 to perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) cause the machine 1000 to perform any one or more of the methodologies discussed herein to be executed. For example, the instructions 1016 may cause the machine 1000 to execute the methods of FIGS. 7 and 8. Additionally, or alternatively, the instructions 1016 may implement FIGS. 1-8 and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1012, 1014 with a single core, multiple processors 1012, 1014 with multiple cores, or any combination thereof.

The memory 1030 may include a main memory 1032, a static memory 1034, and a storage unit 1036, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a LED display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., coupled via a USB).

Moreover, the communication components 1064 may detect identifiers or include components operable to detect identifiers. For example, the communication components 1064 may include radio-frequency identification (RFID) tag reader components, NFC smart tag detection components, optical reader components (e.g., an optical sensor to detect one-dimensional bar codes such as Universal Product Code (UPC) bar codes, multi-dimensional bar codes such as a quick response (QR) code, Aztec code, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (e.g., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A system comprising:

a camera;

a lighting apparatus including a plurality of independently controllable light sources;

a controller; and a computer system comprising at least one hardware processor and a non-transitory computer-readable medium storing instructions that, when executed by the at least one hardware processor, cause the at least one hardware processor to perform operations comprising:

using the camera to capture multiple images of a component, each image being lit by a different light source of the plurality of independently controllable light sources;

applying photometric stereo to the multiple images to estimate a surface height of each point along a surface of the component, the surface height being relative to a horizontal line in each of the multiple images, the applying producing a first version of a two-dimensional height map indicating the surface height of each point along the surface of the component;

blurring the first version of the two-dimensional height map using a blurring technique, producing a first blurred version of the two-dimensional height map;

subtracting the first blurred version from the first version of the two-dimensional height map, resulting in a two-dimensional depth map of the surface;

repeating the blurring and subtracting at least once using the depth map, producing a final version of the two-dimensional depth map;

measuring change in depth of a feature of the surface of the component in the final version of the two-dimensional depth map; and using the change in depth of the feature to determine whether the feature is a defect in the component.

2. The system of claim 1, wherein the blurring technique is a box blur, wherein the box blur assigns a value for a height of a point, in the first version of the two-dimensional height map, to a value equal to an average of a square region, of the first version of the two-dimensional height map, that includes the point.

3. The system of claim 1, wherein the blurring technique is a Gaussian blur.

4. The system of claim 1, wherein the measuring change in depth and/or the using the change in depth of the feature includes feeding the final version of the two-dimensional height map into a convolutional neural network trained to make a prediction of a classification of surface features.

5. The system of claim 4, wherein the convolutional neural network is trained by:

accessing a plurality of images from a first image data source, the plurality of images each having n number of color channels; and training the convolutional neural network using the plurality of images and a plurality of labels, each label corresponding to a classification.

6. The system of claim 1, wherein the surface is curved.

7. The system of claim 1, wherein the surface is sloped at an angle greater than or equal to 45 degrees relative to the horizontal line.

8. A method comprising:

using a camera to capture multiple images of a component, each image being lit by a different light source of a plurality of independently controllable light sources;

applying photometric stereo to the multiple images to estimate surface height of each point along a surface of the component, relative to a horizontal line in each of the multiple images, the applying producing a first version of a two-dimensional height map indicating the surface height of each point along the surface of the component;

blurring the first version of the two-dimensional height map using a blurring technique, producing a first blurred version of the two-dimensional height map;

subtracting the first blurred version from the first version of the two-dimensional height map, resulting in a two-dimensional depth map of the surface;

repeating the blurring and subtracting at least once using the depth map, producing a final version of the two-dimensional depth map;

measuring change in depth of a feature of the surface of the component in the final version of the two-dimensional depth map; and using the change in depth of the feature to determine whether the feature is a defect in the component.

9. The method of claim 8, wherein the blurring technique is a box blur, wherein the box blur assigns a value for a height of a point, in the first version of the two-dimensional height map, to a value equal to an average of a square region, of the first version of the two-dimensional height map, that includes the point.

10. The method of claim 8, wherein the blurring technique is a Gaussian blur.

11. The method of claim 8, wherein the measuring change in depth and/or the using the change in depth of the feature includes feeding the final version of the two-dimensional height map into a convolutional neural network trained to make a prediction of a classification of surface features.

12. The method of claim 11, wherein the convolutional neural network is trained by:

accessing a plurality of images from a first image data source, the plurality of images each having n number of color channels; and training the convolutional neural network using the plurality of images and a plurality of labels, each label corresponding to a classification.

13. The method of claim 8, wherein the surface is curved.

14. The method of claim 8, wherein the surface is sloped at an angle greater than or equal to 45 degrees relative to the horizontal line.

15. A non-transitory machine-readable storage medium having embodied thereon instructions executable by one or more machines to perform operations comprising:

using a camera to capture multiple images of a component, each image being lit by a different light source of a plurality of independently controllable light sources;

applying photometric stereo to the multiple images to estimate surface height of each point along a surface of the component, relative to a horizontal line in each of the multiple images, the applying producing a first version of a two-dimensional height map indicating the surface height of each point along the surface of the component;

blurring the first version of the two-dimensional height map using a blurring technique, producing a first blurred version of the two-dimensional height map;

subtracting the first blurred version from the first version of the two-dimensional height map, resulting in a two-dimensional depth map of the surface;

repeating the blurring and subtracting at least once using the depth map, producing a final version of the two-dimensional depth map;

measuring change in depth of a feature of the surface of the component in the final version of the two-dimensional depth map; and using the change in depth of the feature to determine whether the feature is a defect in the component.

16. The non-transitory machine-readable storage medium of claim 15, wherein the blurring technique is a box blur, wherein the box blur assigns a value for a height of a point, in the first version of the two-dimensional height map, to a value equal to an average of a square region, of the first version of the two-dimensional height map, that includes the point.

17. The non-transitory machine-readable storage medium of claim 15, wherein the blurring technique is a Gaussian blur.

18. The non-transitory machine-readable storage medium of claim 15, wherein the measuring change in depth and/or the using the change in depth of the feature includes feeding the final version of the two-dimensional height map into a convolutional neural network trained to make a prediction of a classification of surface features.

19. The non-transitory machine-readable storage medium of claim 18, wherein the convolutional neural network is trained by:

accessing a plurality of images from a first image data source, the plurality of images each having n number of color channels; and training the convolutional neural network using the plurality of images and a plurality of labels, each label corresponding to a classification.

20. The non-transitory machine-readable storage medium of claim 15, wherein the surface is curved.

* * * * *